United States Patent
Kinoshita et al.

(10) Patent No.: US 6,790,295 B2
(45) Date of Patent: Sep. 14, 2004

(54) METHOD OF IMPROVING SLIDING SURFACES IN ANTI-SEIZURE PROPERTY

(75) Inventors: Toyotaka Kinoshita, Wako (JP); Hiromi Sumi, Wako (JP); Shingo Nakayama, Wako (JP); Yoshinori Takeda, Toyama (JP); Motoharu Yamagoshi, Toyama (JP); Hideki Takeuchi, Toyama (JP)

(73) Assignees: Honda Giken Kogyo Kabushiki Kaisha, Tokyo (JP); Tanaka Seimitsu Kogyo Co., Ltd., Toyama-ken (JP)

( * ) Notice: Subject to any disclaimer, the term of this patent is extended or adjusted under 35 U.S.C. 154(b) by 210 days.

(21) Appl. No.: 10/184,366

(22) Filed: Jun. 25, 2002

(65) Prior Publication Data

US 2003/0010406 A1 Jan. 16, 2003

(30) Foreign Application Priority Data

Jul. 4, 2001 (JP) .................................. 2001-203497

(51) Int. Cl.⁷ .............................. C23C 8/46; C21D 7/06
(52) U.S. Cl. ............................ 148/226; 148/233; 72/53
(58) Field of Search ............................. 148/226, 233; 72/53

(56) References Cited

FOREIGN PATENT DOCUMENTS

| JP | 62-136593 | 6/1987 |
| JP | 09177515 | * 7/1997 |

* cited by examiner

*Primary Examiner*—Sikyin Ip
(74) *Attorney, Agent, or Firm*—Carrier, Blackman & Associates, P.C.; Joseph P. Carrier; William D. Blackman

(57) ABSTRACT

A method of improving wear-resistance and anti-seizing properties of slide surface of machineries, such as outer slide surfaces of piston pins of vehicle engines, wherein slide surfaces of iron or steel base materials of machineries are first processed carburizing, then the carburized surfaces are plated with chromium, and next the chromium-plated surfaces undergo impulses fine peening to produce lubricant-retaining cavities on the slide surfaces, which include fine cavities in the form of depressions in the chromium-plating layer and relatively large cavities produced by exfoliation of the chromium-plating layer.

8 Claims, 4 Drawing Sheets

1. Carburizing
2. Carburizing + Shot peening
3. Carburizing + Cr plating
4. Carburizing + Cr plating + Shot peening 1. Carburizing
2. Carburizing + Shot peening
3. Carburizing + Cr plating
4. Carburizing + Cr plating + Shot peening

METHOD OF IMPROVING SLIDING SURFACES IN ANTI-SEIZURE PROPERTY

BACKGROUND OF THE INVENTION

1. Field of the Invention

This invention relates to a method of improving sliding surfaces of an iron or steel base material of machineries in anti-abrasion property and anti-seizing property.

2. Description of the Related Art

Some piston pins of vehicle engines, for example, are used in slide fitting with pistons or connecting rods via bearing bushes. However, for the purpose of reducing parts and eliminating the steps of press-fitting the bushes, various methods have been proposed to omit bearing bushes and instead improve piston pins themselves in anti-abrasion property. There are, for example, a method of plating the surfaces (outer surfaces), as slide surfaces, of piston pins with chromium, and a method of treating piston pins by shot peening after carburizing.

There is also a method of treating chromium-plated cylinders and piston rings by electrolytic etching to form groove-like oil retainers and thereby prevent seizure, as disclosed in, for example, Japanese Patent Publication No. hei 7-15158.

Piston pins plated merely with chromium are certainly improved in anti-seizing property in relation to connecting rods. In relation to pistons, however, it is known that they are inferior to standard piston pins subjected to carburizing. Additionally, experimental data shows that the conventional method combining carburizing and shot peening can only attain anti-seizing property equivalent to or inferior to the property obtained by chromium plating alone. Furthermore, the method in which chromium plating and electrolytic etching for producing lubricant storing recesses are combined is subjected to serious abrasion of the grinder and takes a long time for the processing. If such method is employed to piston pins not supplied with enough lubricant from around, then the lubricant is liable to escape into groove-like lubricant retainers and break the lubricant film.

SUMMARY OF THE INVENTION

To overcome those problems, the invention provides a method of improving a slide surface of an iron or steel base material in anti-seizing property, comprising: processing the slide surface of the iron or steel material by carburizing; plating the slide surface subjected to the carburizing with chromium; and giving impulses to the slide surface subjected to the plating to produce fine cavities in the form of depressions of the chromium-plating layer and relatively large cavities produced by exfoliation of the chromium-plating layer on the slide surface.

The invention, having the above-summarized configuration and giving impulse to the chromium-plated slide surface, ensures that lubricant is held in the lubricant-retaining cavities formed in the chromium-plating layer by the impulses and prevents seizure of the slide surface. The fine-cavity lubricant retainers initially provide a good lubrication between the slide surface and the mating surface while seldom causing seizure, and when these fine cavities in the form of depressions of the chromium-plating layer are lost due to the surface wear of the chromium-plating layer, the relatively large cavities produced by exfoliation of the chromium-plating layer remain as lubricant retainers and maintain the anti-seizing property for a long time. In addition, since the invention makes the larger cavities by exfoliation and not by plastic deformation, it produces almost no projections (burrs or swellings), and does not need finish machining after shot peening.

In the present invention, each fine cavity preferably has a size not larger than 5 $\mu$m whereas each larger cavity preferably has a size in the range from 5 $\mu$m to 200 $\mu$m to ensure more reliable effects of the invention.

The impulses can be given by shot peening. In this case, glass beads are typically used as peening elements.

The diameter of the beads is preferably in the range of from #120 to 240. It has been found that if the shot peening is carried out with an air pressure from 4.0 to 5.0 kgf/cm$^2$ and at a projection distance of from 20 to 50 mm, the best result will be obtained.

DESCRIPTION OF THE PREFERRED EMBODIMENTS

Figure 1:
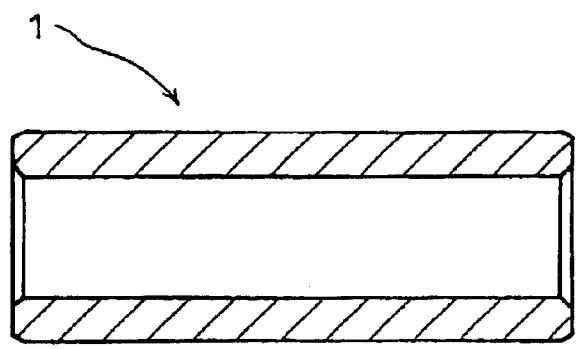
FIG. 1 is a longitudinal sectional view of a piston pin to which the invention is applied.

FIG. 1 is a longitudinal sectional view of a piston pin for a vehicle engine, to which the invention is applied. The piston pin 1 is approximately 50 mm long and 20 mm in diameter. It is first cut out into a predetermined length from a drawn steel material and then machined. As the steel material, SCM415 (Japanese Industrial Standards: JIS) (C:0.13–0.18%, Si:0.15–0.35%, Mn:0.60–0.85%, P:not more than 0.030%, S:not more than 0.030%, Ni:not more than 0.25%, Cr:0.90–1.20%, Mo:0.15–0.30%, Cu:not more than 0.30%, Fe:Remainder) can be used. After the machining, through further sequential steps of carburizing, polishing, chromium plating, re-polishing and fine finishing, it undergoes shot peening as the process of giving impulses to the outer slide surface.

Figure 2:
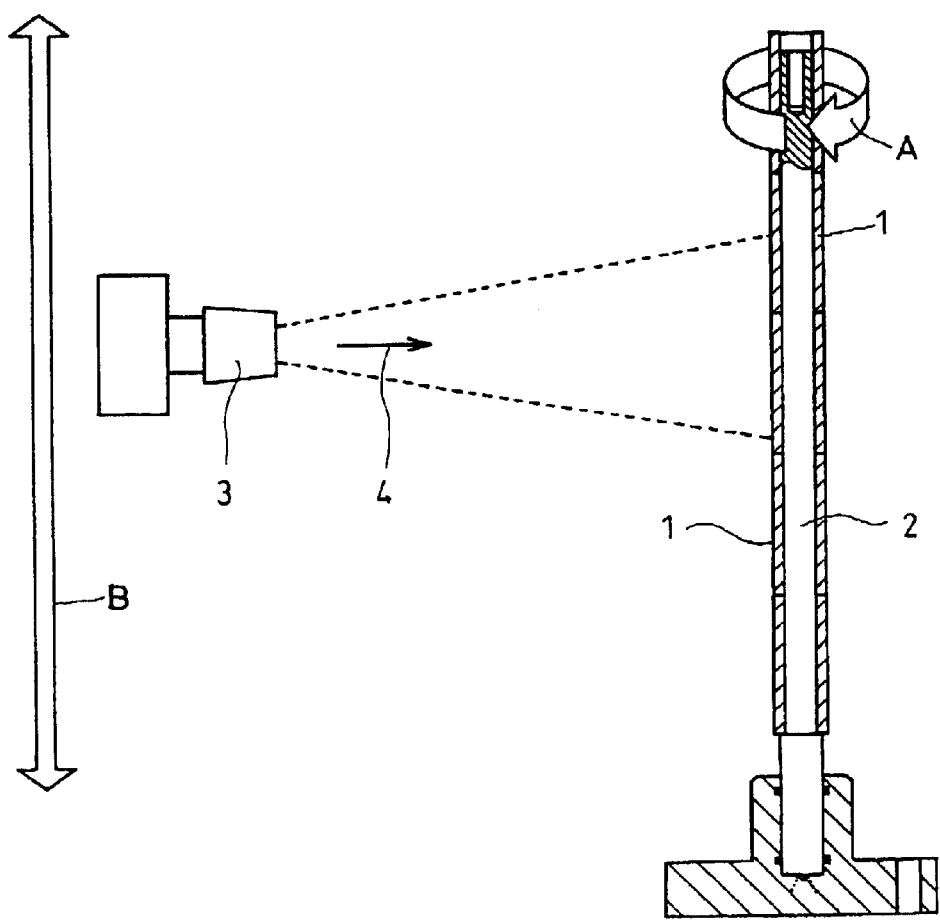
FIG. 2 is a diagram that schematically shows an aspect during shot peening of the piston pins.

FIG. 2 is a side-elevational view that shows an aspect during shot peening of the piston pins 1. Several (five, in the illustration) piston pins 1 held together on a core rod 2 inserted therethrough are rotated together with the core rod 2 at a constant speed as shown by the arrow A. Simultaneously, air containing peening elements is blown against the piston pins 1 from the nozzle 3 located aside and moved vertically in parallel with the piston pin 1 as shown by the arrow B. In this manner, fine cavities of a size not larger than 5 $\mu$m are formed as depressions in the chromium-plating layer on the outer slide surfaces of the piston pins, and the chromium-plating layer is selectively exfoliated to form relatively large cavities (5 $\mu$m to 200 $\mu$m).

Desirable conditions for the shot peening are shown below.

| | |
|---|---|
| Air pressure | 4.0 to 5.0 kgf/cm² |
| Peening elements | Glass beads #120 to #240 |
| Distance for blows | 20 to 50 mm |
| Revolution of the work | 35 rpm |
| Up-down speed of the nozzle | 200 mm/min |
| Frequency of shots | One up-and-down reciprocation |

"#" in the above table means "mesh" that is the number of meshes in an inch. #120 corresponds to a mesh size of 0.2 mm.

A reason for the use of small diameter glass beads in the range of #120 to 240 as the peening elements will be explained. If peening elements with relatively large diameters are used, then burrs (swellings) are produced on the outer slide surface of the work and the work needs another finishing process. However, peening elements with small diameters are unlikely to produce swellings (projections) when hitting the chromium-plating layer of the piston pin as the work, so that the slide surface of the piston pin does not need a further finishing process.

According to the instant embodiment, since the chromium-plated outer slide surfaces of the piston pins undergoes the impulses by shot peening, larger cavities formed in the chromium-plating layer by the impulses function as lubricant retainers and prevent seizure of the piston pin. The lubricant retainers in the form of the fine cavities by depression of the chromium-plating layer initially provide a good lubrication, and when they are lost by the slide surface wear of the chromium-plating layer, the larger cavities by selective exfoliation of the chromium-plating layer still remain and function as lubricant retainers. Therefore, the anti-seizing property of the sliding surface can be maintained for a long time. In addition, since the instant embodiment makes the larger cavities by exfoliation and not by plastic deformation, it produces almost no projections (burrs or swellings), and can omit the finish processing after the shot peening.

Figure 3A:
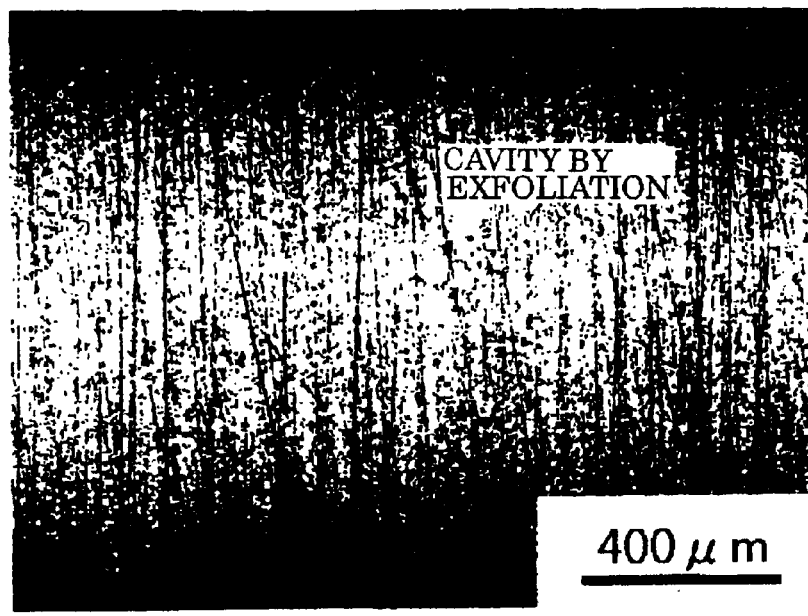
FIG. 3A is a photograph on an enlarged scale that shows the slide surface condition of the piston pin improved in anti-seizing property by the processing according to the invention.
Figure 3B:
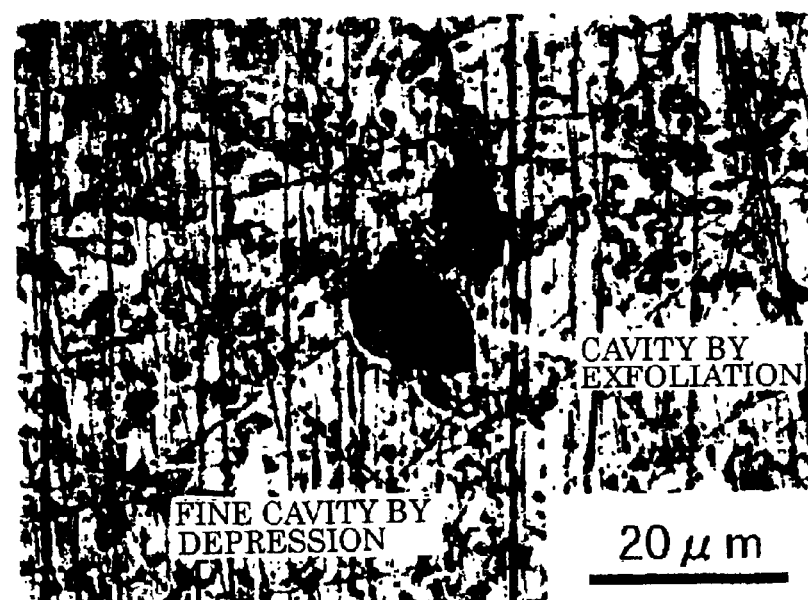
FIG. 3B is a part of the photograph of FIG. 3A on a further enlarged scale.

FIG. 3A is a photograph that shows the outer slide surface condition of the piston pin improved in anti-seizing property by the processing according to the invention, and FIG. 3B is a part of the photograph of FIG. 3A in a greater scale. These photographs clearly show that fine cavities (pits) by depression and larger cavities by exfoliation are produced in the chromium-plating layer on the slide surface of the steel material.

Although the foregoing embodiment uses glass beads as the peening elements and ejects them with air, the invention is not limited to such features. To make such cavities in the chromium-plating layer, it is also possible to use, instead of glass beads, the technique of first making depressions and projections by shots of steel balls, ceramics or silica or by liquid honing, and thereafter removing projections by polishing or super-finishing while maintaining depressions.

Figure 4:
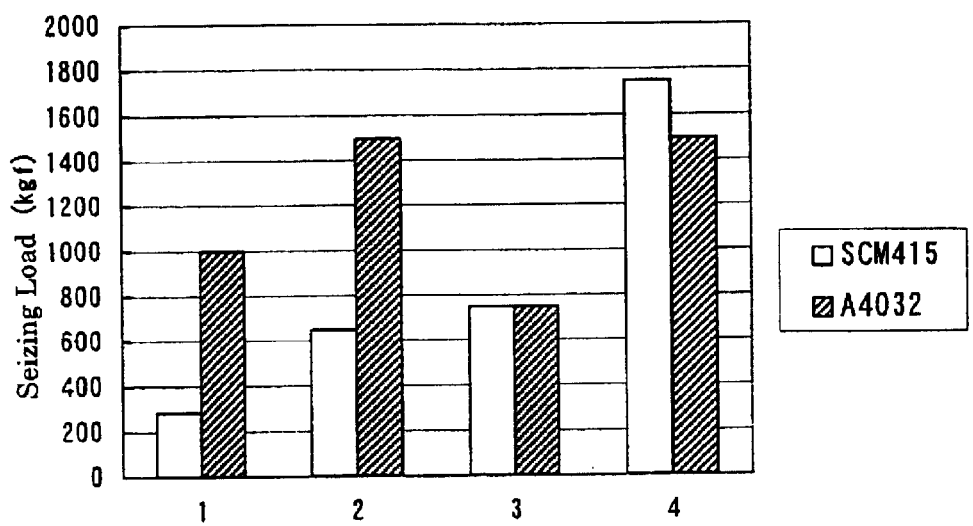
FIG. 4 is a diagram for explaining effects of the invention.

Next will be described a result of a test for confirming effects of the invention. FIG. 4 shows a result of measurement of loads causing seizure, which were obtained by a Falex method (Faville test). The Falex method uses a pair of test piece gripping blocks each having a straight groove of U-shaped (or V-shaped) cross-sectional shape. These test piece gripping blocks are arranged in mutually facing disposition with their grooves in mutually opposing relation. A test piece (cylindrical test pin) is inserted into the space defined by the opposing grooves and gripped by the test piece gripping blocks, which are caused to apply gradually increasing pressing forces to the test piece held between the grooves. The test piece thus held and being applied with the pressing forces is forcibly rotated around its own longitudinal axis against the pressing force being applied thereto by the gripping blocks. To rotate the test piece around its own axis, a rotary driving hub is fitted coaxially on one end of the test piece (test pin) and a shear pin is passed diametrically through both the driving hub and the one end of the test piece. While the test piece is being forcibly rotated against the pressing force exerted by the gripping blocks, it is observed whether seizure occurs between the slide surface of the test piece and the slide surfaces of the gripping blocks, and the load being applied to the test piece when seizure occurs is determined to be the seizure load.

As the material of the gripping blocks having the U-shaped (V-shaped) groove that were used in the test, two materials were used, which are the above mentioned SCM415 (JIS) material usable as piston pins or connecting rods, which are mating members of the piston of vehicle engines, and an A4032 (JIS) material (aluminum alloy including Si:11.0–13.5%, Fe:not more than 1.0%, Cu:0.50–1.3%, Mg:0.8–1.3%, Cr:not more than 0.10%, remainder Al) usable as pistons of vehicle engines. As the material of the test piece, the above mentioned SCM415 (JIS) material usable as piston pins is used. In order to comparatively determine the effects, the test pieces were processed in four different ways: namely, (1) carburizing alone; (2) a combination of carburizing and subsequent shot peening; (3) a combination of carburizing and chromium-plating; and (4) a combination of carburizing, chromium-plating and shot peening according to the present invention. The test piece has a diameter of 6.5 mm and a length of 40 mm.

As shown, with the use of the above mentioned SCM415 (JIS) material as the test piece, the method of the invention of (4) above, combining carburizing, chromium plating and shot peening, remarkably improves the anti-seizing property far better than the other processes (1), (2) and (3), both in the case (shown with the white graph bars) of using the SCM415 (JIS) material as the material of the gripping blocks having the U-shaped (or V-shaped) grooves and in the case (shown with the hatched graph bars)of using the A4032 (JIS) material as the material of the gripping blocks.

Although there has been described what is the present embodiment of the invention, it will be understood by persons skilled in the art that variations and modifications may be made thereto without departing from the gist, spirit or essence of the invention, as reflected in the scope of the appended claims.

What is claimed is:

1. A method of improving a slide surface of an iron or steel base material in anti-seizing property, comprising:
   processing said slide surface of the iron or steel material by carburizing;
   plating said slide surface subjected to the carburizing with chromium; and
   giving impulses to said slide surface subjected to the plating to produce fine cavities in the form of depressions of the chromium-plating layer and relatively large cavities produced by exfoliation of said chromium-plating layer on said slide surface.

2. A method of improving a slide surface of an iron or steel base material in anti-seizing property according to claim 1, wherein said fine cavities have a size not larger than 5 μm, and said relatively large cavities have a size in the range of from 5 μm to 200 μm.

3. A method of improving a slide surface of an iron or steel base material in anti-seizing property according to claim 1, wherein said impulses are given by shot peening.

4. A method of improving a slide surface of an iron or steel base material in anti-seizing property according to claim 3 wherein said shot peening uses glass beads as peening elements.

5. A method of improving a slide surface of an iron or steel base material in anti-seizing property according to claim 4, wherein said glass beads are in the range of from #120 to #240 in mesh size, and the shot peening is carried out with an air pressure from 4.0 to 5.0 kgf/cm$^2$ and at a projection distance of from 20 to 50 mm.

6. A method of improving a slide surface of an iron or steel base material in anti-seizing property according to claim 1, wherein said fine cavities and said relatively large cavities are formed simultaneously in slide surface by said impulses.

7. A method of improving a slide surface of an iron or steel base material in anti-seizing property according to claim 1, wherein said impulses given to said slide surface to produce said relatively large cavities cause substantially no plastic deformation of the slide surface.

8. A method of improving a slide surface of an iron or steel base material in anti-seizing property according to claim 1, wherein said impulses involve mechanical impacting of said slide surface.

* * * * *

UNITED STATES PATENT AND TRADEMARK OFFICE
CERTIFICATE OF CORRECTION

PATENT NO. : 6,790,295 B2
DATED : September 14, 2004
INVENTOR(S) : Kinoshita et al.

It is certified that error appears in the above-identified patent and that said Letters Patent is hereby corrected as shown below:

Title page,
Item [57], ABSTRACT, between "Faces undergo impulses" and "peening to produce lubricant", change "fine" to -- by shot --.

Column 2,
Line 13, after "in the range", delete "of".
Line 16, between "a projection distance" and "from 20 to 50" delete "of".

Signed and Sealed this

First Day of February, 2005

JON W. DUDAS
*Director of the United States Patent and Trademark Office*